(12) United States Patent
Tsang Min Ching

(10) Patent No.: US 11,922,709 B2
(45) Date of Patent: Mar. 5, 2024

(54) CELL DETECTION USING SEGMENTATION BASED ON NUCLEAR STAINING AND MFISH IMAGES

(71) Applicant: Applied Materials, Inc., Santa Clara, CA (US)

(72) Inventor: Jean-Marc Tsang Min Ching, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 59 days.

(21) Appl. No.: 17/405,740

(22) Filed: Aug. 18, 2021

(65) Prior Publication Data

US 2022/0058370 A1 Feb. 24, 2022

Related U.S. Application Data

(60) Provisional application No. 63/069,672, filed on Aug. 24, 2020.

(51) Int. Cl.
  *G06V 20/69* (2022.01)
  *G06V 10/44* (2022.01)

(52) U.S. Cl.
  CPC ............ *G06V 20/698* (2022.01); *G06V 10/44* (2022.01); *G06V 20/695* (2022.01)

(58) Field of Classification Search
  CPC .......... G06V 20/69–698; G06V 10/44; G06V 20/695; G06V 10/28; G06V 10/762; G06V 20/70
  See application file for complete search history.

(56) References Cited

U.S. PATENT DOCUMENTS 11,174,508 B2  11/2021 Marggraf-Rogalla et al.
2002/0154798 A1 10/2002 Cong et al.
(Continued)

FOREIGN PATENT DOCUMENTS

CN  108467884  8/2018

OTHER PUBLICATIONS

"Huiguang Yang et al., Automatic segmentation of granular objects in images: Combining local density clustering and gradient-barrier watershed, Pattern Recognition vol. 47, Issue 6, Jun. 2014, pp. 266-2279" (Year: 2014).*

(Continued)

*Primary Examiner* — Andrae S Allison
*Assistant Examiner* — Phuong Hau Cai
(74) *Attorney, Agent, or Firm* — Fish & Richardson P.C.

(57) ABSTRACT

Detecting cells depicted in an image using RNA segmentation can include obtaining a FISH image of a tissue that depicts multiple cells, obtaining a nuclear stained image of the tissue, and generating a mask that includes multiple areas that each have a position with respect to the tissue by enhancing structures depicted in the FISH image. Edges depicted in the enhanced FISH image are detected to use for the mask, and positions are determined for a first plurality of regions that fit potential nuclei depicted in the nuclear stained image. A second plurality of regions are selected from the first plurality by determining, using the mask, which regions from the first plurality overlap with the position of an area from multiple areas in the mask. Unique nuclei in the tissue are labelled using the second plurality of regions that each indicate a potential nuclei in the tissue.

18 Claims, 11 Drawing Sheets

(56) References Cited

U.S. PATENT DOCUMENTS

| | | | |
|---|---|---|---|
| 2005/0232488 A1 | 10/2005 | Lee et al. | |
| 2013/0230230 A1* | 9/2013 | Ajemba | G06K 9/00417 |
| | | | 382/133 |
| 2014/0126802 A1 | 5/2014 | Adiga et al. | |
| 2014/0153811 A1* | 6/2014 | Seppo | G06T 7/0014 |
| | | | 382/133 |
| 2015/0226743 A1* | 8/2015 | Weiss et al. | G01N 33/57407 |
| 2019/0156103 A1* | 5/2019 | Sarkar | G06V 20/69 |
| 2020/0020109 A1* | 1/2020 | Sarkar | G06T 7/136 |
| 2020/0193139 A1 | 6/2020 | Behrooz et al. | |

OTHER PUBLICATIONS

"Alex Levinshtein et al., Multiscale Symmetric Part Detection and Grouping," Comput Vis (2013) 104: 117-134, Springer Science+Business Media New York, published Feb. 2013 (Year: 2013).*

"Umesh Adiga et al., An Efficient Method based on Watershed and Rule-Based Merging for Segmentation of 3-D hist.-path. Images, Pattern Recognition 34 (2001), 1449-1458" (Year: 2001).*

Mi-Ra Jung et al., Automatic Cell Segmentation and Classification using Morphological Features and Bayesian Networks, Dept. of Computer Engineering, Keimyung Univ., Event: Electronic Imaging, 2008, San Jose, CA U.S.A (Year: 2008).*

"Byoung Chul Ko et al., Automatic White Blood Cell Segmentation Using Stepwise Merging Rules and Gradient Vector Flow Snake, Micron 42 ()2011) 695-705, Korea" (Year: 2011).*

"Francesco Raimondo et al., Automated evaluation of her-2/neu status in breast tissue from fluorescent in situ hybridization images, IEEE Transactions on Image Processing, vol. 14, No. 9, Sep. 2005" (Year: 2005).*

"Tatjana Trcej et al., *Drosophila* germ granules are structured and contain homotypic mRNA clusters, Nature Communications | 6:7962, Aug. 2015" (Year: 2015).*

"Shereen Fouad, Morphological Separation of Clustered Nuclei in Histological Images, A. Campilho and F. Karray (Eds.): ICIAR 2016, LNCS 9730, pp. 599-607, 2016" (Year: 2016).*

"Gang Lin et al., Hierarchical, model-based merging of multiple fragments for improved three-dimensional segmentation of nuclei, Dec. 2004, Cytometry PARTA, Journal of Quantitative Cell Science, vol. 63A, pp. 20-33" (Year: 2004).*

"Congcong Zhang, White Blood Cell Segmentation by Color-Space-Based K-means Clustering, 09, 2014, Sensors ISSN 1412-8200 , pp. 16128-16147" (Year: 2014).*

Moffitt et al., "Molecular, spatial and functional single-cell profiling of the hypothalamic preoptic region," Science, Nov. 16, 2018, 362(6416):1-31.

Wikipedia.com [online], "Fluorescence in situ hybridization," Apr. 16, 2020, retrieved on May 15, 2020, retrieved from URL <https://en.wikipedia.org/w/index.php?title=Fluorescence_in_situ_hybridization&oldid=951374201>, 10 pages.

Wikipedia.com [online], "Otsu's method, " May 11, 2020, retrieved on May 15, 2020, retrieved from URL <https://en.wikipedia.org/w/index.php?title=Otsu%27s_method&oldid=956139805>, 7 pages.

Office Action in Taiwanese Appln. No. 110130636, dated Apr. 6, 2022, 5 pages (with English search report).

Al-Kofahi et al., "A deep learning-based algorithm for 2-D cell segmentation in microscopy images," BMC Bioinformatics, 2018, 19(article 365):1-11.

International Search Report and Written Opinion in International Appln. No. PCT/US2021/046553, dated Dec. 15, 2021, 10 pages.

Russell et al., "Segmentation of fluorescence microscopy images for quantitative analysis of cell nuclear architecture, " Biophysical Journal, 2009, 96:3379-3389.

\* cited by examiner

CELL DETECTION USING SEGMENTATION BASED ON NUCLEAR STAINING AND MFISH IMAGES

CROSS-REFERENCE TO RELATED APPLICATION

This application claims the benefit of U.S. Provisional Application No. 63/069,672, filed on Aug. 24, 2020, the contents of which are incorporated by reference herein.

TECHNICAL FIELD

This specification relates to detection in an image of cells within a tissue and features of the cells.

BACKGROUND

Some companies in the biotech and pharmaceutical industry visualize and quantify multiple biological analytes—e.g., DNA, RNA, and protein—within a biological sample—e.g., tissue resection, biopsy, cells grown in culture. Scientists can use such methods to diagnose or monitor a disease, validate biomarkers, or investigate treatment. Some example methods include multiplex imaging of antibodies or oligonucleotides (e.g., RNA or DNA) labeled with a functional domain to a biological sample.

Multiplexed fluorescence in-situ Hybridization ("mFISH") imaging is a powerful technique to determine gene expression in spatial transcriptomics. In brief, a sample is exposed to multiple oligonucleotide probes that target RNA, DNA, or other features of interest. These probes have different labeling schemes that will allow one to distinguish different RNA or DNA nucleotide segments when the complementary, fluorescent labeled probes are introduced to the sample. Then the sequential rounds of fluorescence images are acquired with exposure to excitation light of different wavelengths. For each given pixel, its fluorescence intensities from the different images for the different wavelengths of excitation light form a signal sequence. This sequence is then compared to a library of reference codes from a codebook that associates each code with a gene. The best matching reference code is used to identify an associated gene that is expressed at that pixel in the image.

SUMMARY

In general, one aspect of the subject matter described in this specification can be embodied in methods that include the actions of obtaining a fluorescent in-situ hybridization image of a tissue that depicts a plurality of cells, obtaining a nuclear stained image of the tissue, and generating a mask that includes a plurality of areas that each have a position with respect to the tissue by enhancing, in the fluorescent in-situ hybridization image, structures depicted in the fluorescent in-situ hybridization image. Edges depicted in the enhanced fluorescent in-situ hybridization image are detected to use for the mask, and positions are determined for a first plurality of regions that fit potential nuclei depicted in the nuclear stained image. A second plurality of regions are selected from the first plurality of regions by determining, using the mask, which regions from the first plurality of regions overlap with the position of an area from the plurality of areas in the mask. Unique nuclei in the tissue are labelled using the second plurality of regions that each indicate a potential nuclei in the tissue.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, labelling the unique nuclei in the tissue using the second plurality of regions that each indicate a potential nuclei in the tissue can include: associating each region in the second plurality of regions with a nuclei cluster; for each of the nuclei clusters: determining, for each region associated with the nuclei cluster, an area of overlap between the region and a closest region in the nuclei cluster using the positions of the regions with respect to the tissue; and generating a first mask that represents each region associated with the nuclei cluster whose area of overlap satisfies a threshold overlap and size satisfies a first threshold size using the nuclear stained image; and labelling the unique nuclei of the tissue using the first mask. The method can include performing edge detection on data for the nuclear stained image of the tissue to generate edge detection data, wherein generating the first mask comprises generating the first mask using the edge detection data.

In some implementations, labelling the unique nuclei in the tissue using the second plurality of regions that each indicate a potential nuclei in the tissue can include for each of the nuclei clusters: generating a second mask that represents each region associated with the nuclei cluster whose area of overlap satisfies the threshold overlap and size satisfies a second threshold size smaller than the first threshold size using the nuclear stained image; and labelling the unique nuclei of the tissue using the first mask, and the second mask. Labelling the unique nuclei in the tissue using the second plurality of regions that each indicate a potential nuclei in the tissue can include for each of the nuclei clusters: generating a third mask using a difference between the first mask and the second mask, the third mask including one or more subtracted regions that represent the difference; and labelling the unique nuclei of the tissue using the first mask, the second mask, and the third mask. The method can include updating the first mask to include the subtracted regions from the third mask that overlap with a region represented by the second mask and do not depict a unique nucleus. The method can include labelling, for each subtracted region in a third mask that has a unique nucleus and whose size satisfies the second threshold size, a subtracted region from the third mask as a unique nucleus.

In some implementations, obtaining the fluorescent in-situ hybridization image can include obtaining the fluorescent in-situ hybridization image of the tissue that has an extracellular matrix. Obtaining the nuclear stained image of the tissue can include obtaining the nuclear stained image of the tissue that has an extracellular matrix. Obtaining the fluorescent in-situ hybridization image can include obtaining the fluorescent in-situ hybridization image of the tissue that depicts the plurality of cells with tubular structures. Obtaining the nuclear stained image of the tissue can include obtaining the nuclear stained image of the tissue that depicts the plurality of cells with tubular structures.

In some implementations, detecting edges depicted in the enhanced fluorescent in-situ hybridization image can include generating a binary image from the enhanced fluorescent in-situ hybridization image; generating an updated binary image by performing one or more of: connecting fine features depicted in the binary image; removing isolated pixels depicted in the binary image; or filling holes depicted in the binary image; and detecting edges depicted in the updated binary image.

Cell segmentation can be performed on an intact tissue within a complex environment, e.g., for cells that have an extracellular matrix, such as brain tissue. Fluorescent in-situ hybridization images acquired for spatial transcriptomics can be used to enhance the fine features of the cells, e.g., dendrites of a nerve cell, and a nucleus-stained image to obtain single nuclei information. Cells morphology and features can be obtained while the tissue is still intact. For instance, features other than the cell membrane, such as tubules, can be preserved in the fluorescent in-situ hybridization images.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
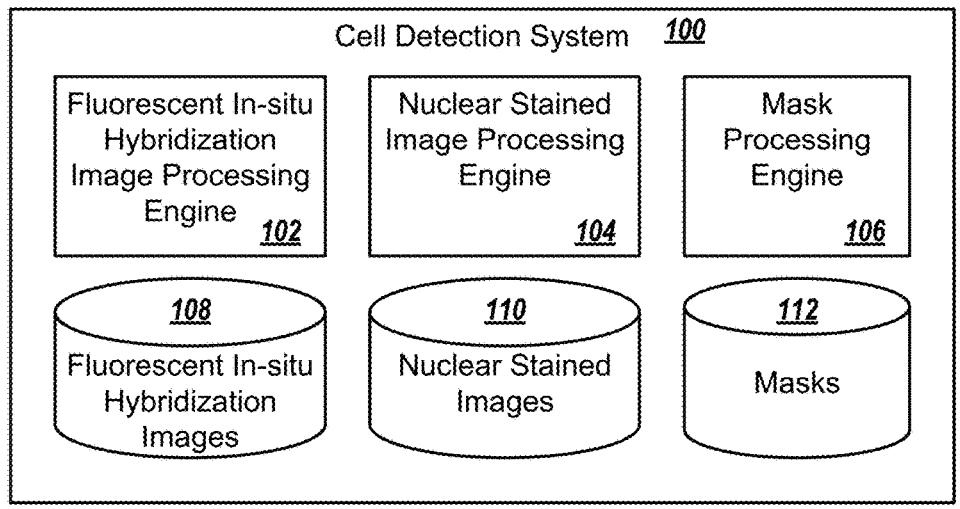
FIG. 1 depicts an example of a cell detection system.

Some systems use membrane staining to improve the contrast been cell features of interest and background content in images of tissue. The cell features can be used to define, classify, and differentiate each cell present in a heterogeneous population of an intact tissue. Such processes can be difficult in a complex environment, e.g., for tissues that have an extracellular matrix, such as brain tissue. The membrane staining processes might not maintain an intact tissue, e.g., the staining process might pierce one or more layers, e.g., the cell membrane, of the tissue. Further, some staining processes might not accurately capture the intricate shape and structure and fine features of each cell, e.g., dendrites of a nerve cell. Some membrane staining processes may lose the membrane-bound proteins, be unable to use conventional antibodies markers to target the cell membrane, or both, since the tissue sample is permeabilized prior to imaging. These processes might also have poor signal, high variability, discontinuity and additional time needed for staining and imaging.

The cell detection system described in this document enables cell segmentation on images of an intact tissue within a complex environment, e.g., for cells that have an extracellular matrix, such as brain tissue. The cell detection system can use fluorescent in-situ hybridization images acquired for spatial transcriptomics to enhance the fine features of the cells, e.g., dendrites of a nerve cell, and a nucleus-stained image to obtain single nuclei information. The cell detection system can combine two intermediate outputs from the two images to extract data for single cells, depicted in the images while preserving the cells' morphology and features, e.g., while the tissue is still intact. For instance, the cell detection system can preserve features other than the cell membrane, such as tubules, in the fluorescent in-situ hybridization images. Some example images include ribonucleic acid ("RNA") images, deoxyribonucleic acid ("DNA") images, and images of viral sequences (an "RNA image," "DNA image," etc., is shorthand for an image generated by fluorescence microscopy using probes that target nucleotide segments of the respective source material).

Since the cell detection system does not rely on membrane-stained images, it does not have the limitations of those processes. For instance, it does not have the poor signal, high variability, discontinuity, additional time needed for staining and imaging of the membrane-stained image processes, or a combination of these. Instead, the cell detection system has an improved signal, reduced variability, continuity, reduced time to process images, or a combination of two or more of these. Further, the cell detection system can combine operations to extract the fine features, especially tubules of the cells in brain tissue. The cell detection system can generate data for more elaborate downstream analysis, like cell classification, e.g., more data, more accurate data, or both, compared to other systems. The cell detection system can also be a more generalized approach and is not limited to a specific dataset, e.g., in contrast to deep learning processes.

The term "tissue" here refers to a group of cells of similar structure and function, as opposed to individual cells. The color, texturing, and similar image properties of tissues are significantly different from those of individual cells, so image processing techniques applicable to cell classification often are not applicable to segmenting images of tissue samples and classifying those segments.

FIG. 1 depicts an example of a cell detection system 100. The cell detection system 100 includes multiple engines for processing image data. For example, the cell detection system 100 includes a fluorescent in-situ hybridization image processing engine 102 that processes fluorescent in-situ hybridization images 108 of tissues. The fluorescent in-situ hybridization images 108 can be RNA images, DNA images, images of viral sequences, or any other appropriate type of images.

The fluorescent in-situ hybridization images 108 can be images of tissues processed using a fluorescence in-situ hybridization process ("FISH" process). The other system can use any appropriate process to create the fluorescent in-situ hybridization images 108. For instance, another system can use multiplexed FISH ("mFISH"), or a multiplexed error-robust FISH ("MERFISH") process to detect individual molecules, e.g., RNA or DNA or of viral sequences, with single-molecule FISH ("smFISH").

Figure 1A:
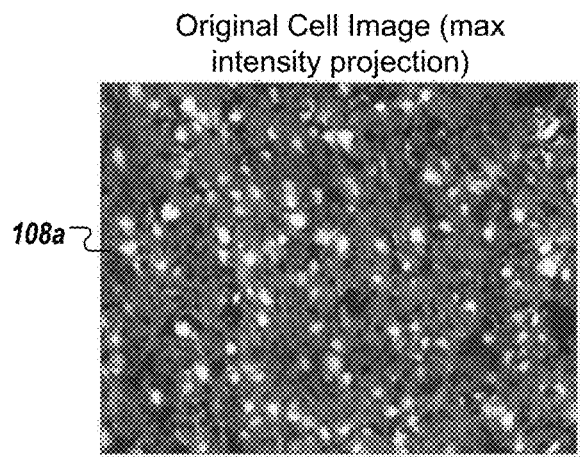
FIGS. 1A-1F depict images generated by the cell detection system.
Figure 1C:
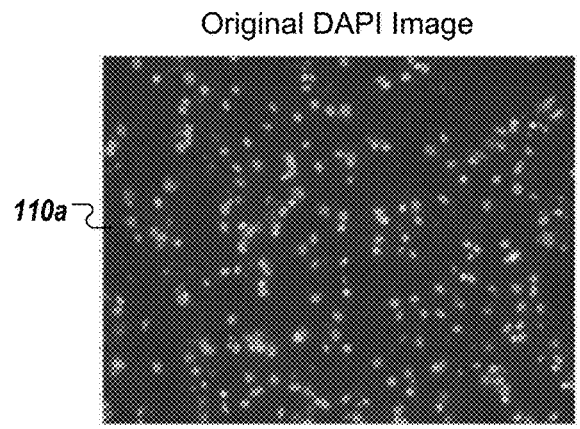
Figure 1B:
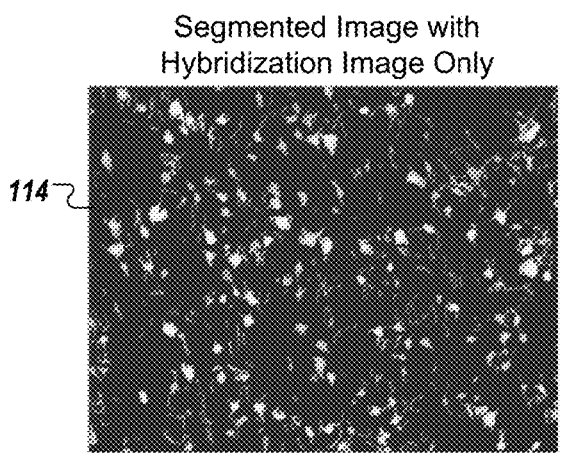

The fluorescent in-situ hybridization image processing engine 102 can process a first fluorescent in-situ hybridization image 108a (see FIG. 1A), from the fluorescent in-situ hybridization images 108, to generate a fluorescent processed image 114 (see FIG. 1B). For instance, the fluorescent in-situ hybridization image processing engine 102 can amplify edges in the fluorescent in-situ hybridization image 108a and enhance images structures depicted in the image to generate the fluorescent processed image 114, as discussed in more detail below. The fluorescent processed image 114 can include data that represents predicted isolated nuclei.

A nuclear stained image processing engine 104, included in the cell detection system 100, can process a nuclear stained image 110a (see FIG. 1C) for the tissue. For instance, the cell detection system 100 can include a database of nuclear stained images 110 that include the nuclear stained image 110a. The nuclear stained image processing engine 104 retrieves, from the database, the nuclear stained image 110a that corresponds to the same region of the tissue as the fluorescent in-situ hybridization image 108a processed by the fluorescent in-situ hybridization image processing engine 102.

The nuclear stained image processing engine 104 can analyze the nuclear stained image 110a to determine a plurality of regions that fit potential nuclei depicted in the nuclear stained image 110a. In some examples, the nuclear stained image processing engine 104 can segment the nuclear stained image 110a by color, intensity, or both, to generate a segmented image. The segmented image includes the plurality of regions each of which have a different color range, intensity range, or a combination of both. The nuclear stained image processing engine 104 can analyze the regions to determine regions that have a predetermined shape, e.g., ellipse or circle, a predetermined size range, e.g., 4-6 microns, or both. The nuclear stained image processing engine 104 can tag the regions that have the predetermined shape, the predetermined size, or both, as identifying potential nuclei.

The regions can be any appropriate size. For instance, the nuclear stained image processing engine 104 can select different sized regions based on the potential nuclei, e.g., the features depicted in the nuclear stained image 110a that represent potential nuclei.

Figure 1D:
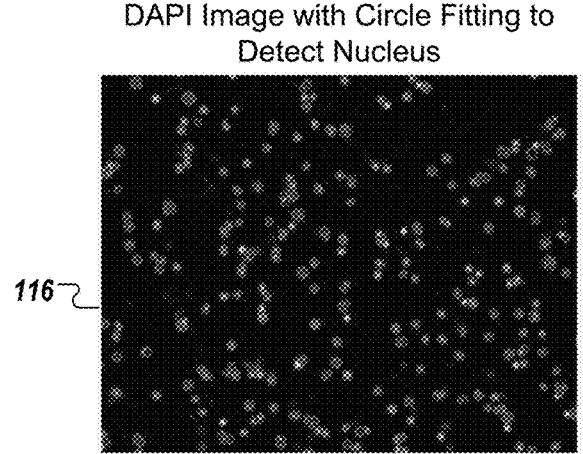

The nuclear stained image processing engine 104 can generate a nuclear stained processed image 116 (see FIG. 1D), or other appropriate data, that identifies the plurality of regions. For example, the nuclear stained image processing engine 104 can generate the nuclear stained processed image 116 that includes region labels, depicted in the nuclear stained processed image 116, that represent the regions. The region labels can be circles, ellipses, or other appropriate shapes to represent the regions that are added to the nuclear stained processed image 116, e.g., and can be part of the content depicted in the image or can be metadata stored with the image. The region labels can be a mask depicted in the nuclear stained processed image 116.

In some examples, the nuclear stained image processing engine 104 can generate metadata that identifies the plurality of regions. The nuclear stained image processing engine 104 can generate region data that identifies the regions. The region data can include coordinates, e.g., x and y coordinates, that represent the regions. The coordinates can indicate a center of a region, a point on an edge of the region, a radius or a diameter for the region, or a combination of two or more of these.

Figure 1E:
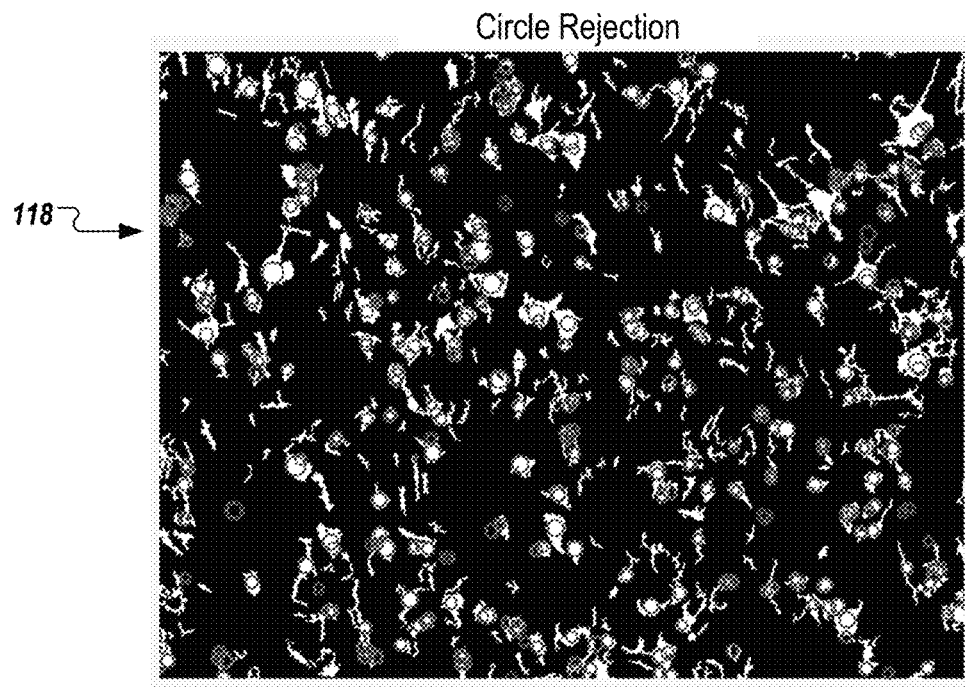

A mask processing engine 106 can use data for the fluorescent processed image 114 and data for the nuclear stained processed image 116 to generate combined image data 118 (see FIG. 1E), as discussed in more detail below. The mask processing engine 106 can use the combined image data to generate one or more masks. The mask processing engine 106 can use the masks to identify nuclei, clusters of nuclei, or both, in the tissue, e.g., depicted in the fluorescent in-situ hybridization image 108a and the nuclear stained image 110a.

Figure 1F:
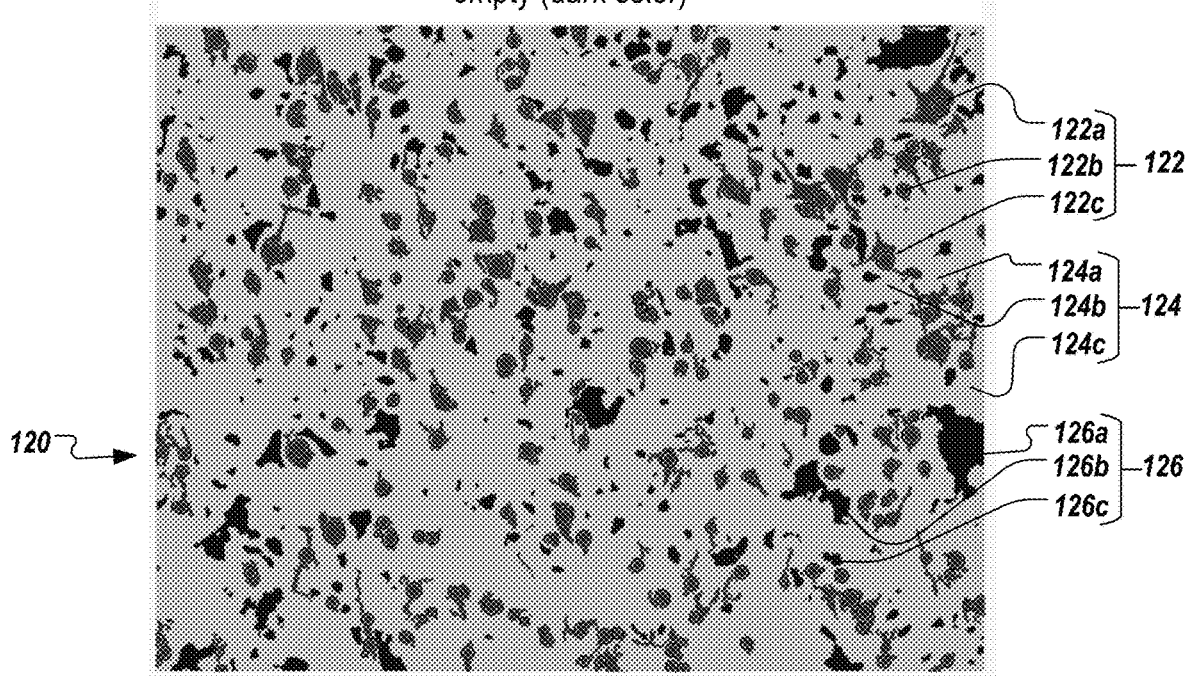

The mask processing engine 106 can use the masks to determine labels for regions in the tissue. For instance, referring to FIG. 1F, the mask processing engine can determine predicted cell regions 122a-abc, predicted tissue regions 124a-abc, and predicted empty regions 126a-abc, as shown in an example output image 120.

The mask processing engine 106 can use the fluorescent processed image 114 as a mask for the nuclear stained processed image 116 when generating data for the example output image 120. The mask processing engine 106 need not generate an output image 120 hut can generate cell feature data representing features of the example output image 120, e.g., the predicted cell regions 122a-abc, the predicted tissue regions 124a-abc, the predicted empty regions 126a-abc, or a combination of two or more of these. The mask processing engine 106 can use the two images 114, 116 to determine which regions from the nuclear stained processed image 116 overlap with predicted nuclei areas in the fluorescent processed image 114.

The mask processing engine 106, or another component in the cell detection system 100, can use one or more steps described in more detail below to generate data for the example output image 120. For instance, the cell detection system 100 can generate one or more intermediate masks using data for the fluorescent processed image 114, the nuclear stained processed image 116, the fluorescent in-situ hybridization image 108a, the nuclear stained image 110a, or a combination of two or more of these, e.g., as described in more detail below.

The cell detection system 100 can provide cell feature data for the output image 120 to another system for processing or perform additional analysis on the data. For instance, the cell feature data can identify segmented cells in the tissue depicted in the fluorescent in-situ hybridization image 108a and the nuclear stained image 110a. The cell detection system 100 or the other system can analyze the cell feature data for the tissue depicted in the images, e.g., to determine the tissue's spatial organization, connectivity, functional properties, such as an associated gene, or a combination of two or more of these.

The cell detection system 100 is an example of a system implemented as computer programs on one or more computers in one or more locations, in which the systems, components, and techniques described in this document are implemented. The cell detection system 100 may use a single server computer or multiple server computers operating in conjunction with one another, including, for example, a set of remote computers deployed as a cloud computing service.

The cell detection system 100 can include several different functional components, including the fluorescent in-situ hybridization image processing engine 102, the nuclear stained image processing engine 104, and the mask processing engine 106. The fluorescent in-situ hybridization image processing engine 102, the nuclear stained image processing engine 104, the mask processing engine 106, or a combination of these, can include one or more data processing apparatuses. For instance, each of the fluorescent in-situ hybridization image processing engine 102, the nuclear stained image processing engine 104, and the mask processing engine 106 can include one or more data processors and instructions that cause the one or more data processors to perform the operations discussed herein.

The various functional components of the cell detection system 100 may be installed on one or more computers as separate functional components or as different modules of a same functional component. For example, the fluorescent in-situ hybridization image processing engine 102, the nuclear stained image processing engine 104, the mask processing engine 106, or a combination of these can be implemented as computer programs installed on one or more computers in one or more locations that are coupled to each through a network. In cloud-based systems for example, these components can be implemented by individual computing nodes of a distributed computing system.

Figure 2:
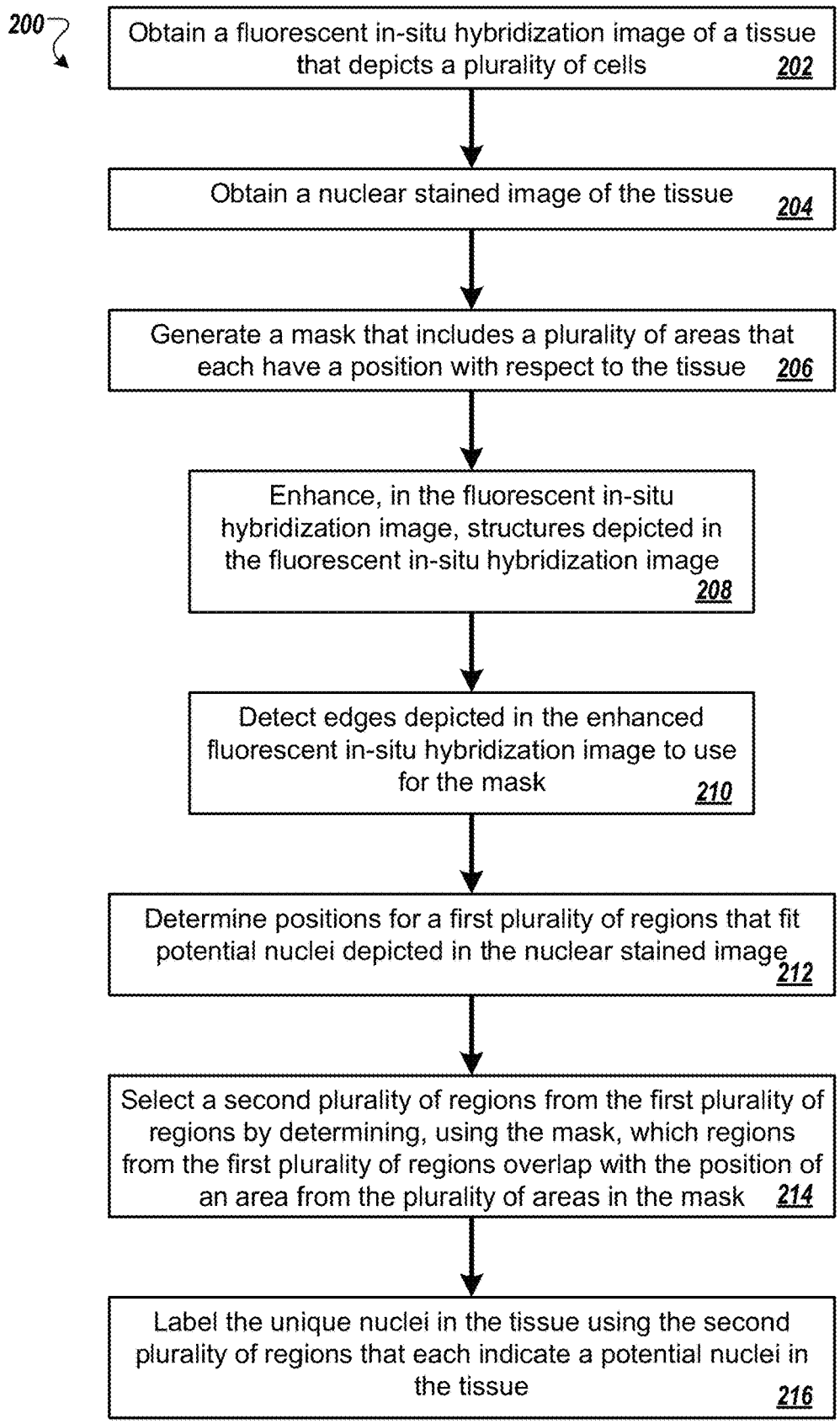
FIG. 2 is a flow diagram of a process for identifying and labelling nuclei in a tissue.

FIG. 2 is a flow diagram of a process 200 for identifying and labelling nuclei in a tissue example, the process 200 can be used by the cell detection system 100 described with reference to FIG. 1. The cell detection system can label nuclei with cell feature data that can be used to determine the tissue's spatial organization, connectivity, functional properties, such as an associated gene, or a combination of two or more of these.

A cell detection system obtains a fluorescent in-situ hybridization image of a tissue that depicts a plurality of cells (202). For example, the cell detection system can obtain the fluorescent in-situ hybridization image from a database, an input device, e.g., a camera, or another appropriate source. The database can be part of the cell detection system or another system.

The cell detection system obtains a nuclear stained image of the region of the tissue that includes the plurality of cells (204). For instance, the cell detection system can obtain the nuclear stained image from a database, e.g., stored on a memory included in the cell detection system or another system. The cell detection system can obtain the nuclear stained image from any appropriate source, e.g., an input device such as a camera.

The cell detection system generates a mask that includes a plurality of areas that each have a position with respect to the tissue (206). The mask can be generated based on the region labels, e.g., the "holes" in the mask can correspond to the labelled regions. For example, the cell detection system can generate, as the mask, a binary image that includes, for each region label, a corresponding area of the mask in which, bits have a first value and. For the other areas in the image, the bits are set to have a second, different value. The first value can be one or zero. The second value would be the "opposite" of the first value, e.g., zero when the first value is one or one when the first value is zero.

The areas can represent predicted nuclei areas, e.g., isolated nuclei areas. In some examples, the areas can represent predicted nuclei without distinguishing between two adjacent nuclei, e.g., two adjacent cell nuclei. The cell detection system can perform one or both of steps 208 or 210 to generate the mask.

The cell detection system enhances, in the fluorescent in-situ hybridization image, structures depicted in the fluorescent in-situ hybridization image to generate an enhanced image (208). The cell detection system can use any appropriate process to enhance the structures. For example, the cell detection system can apply a Hessian-based multiscale filter to the fluorescent in-situ hybridization image to enhance structures depicted in the image. The cell detection system can enhance elongated structures, tubular structures, or both, depicted in the fluorescent in-situ hybridization image.

The cell detection system detects edges depicted in the enhanced fluorescent in-situ hybridization image to use for the mask (210). The cell detection system can use any appropriate process to detect edges depicted in the enhanced image. For example, the cell detection system can apply Sobel edge detection to the enhanced image to detect edges of cells depicted in the enhanced image. The cell detection system can update the enhanced image using data for the detected edges depicted in the enhanced image, e.g., by increasing a width of the detected edges, changing a color of the detected edges, or otherwise amplifying the detected edges.

Figure 3A:
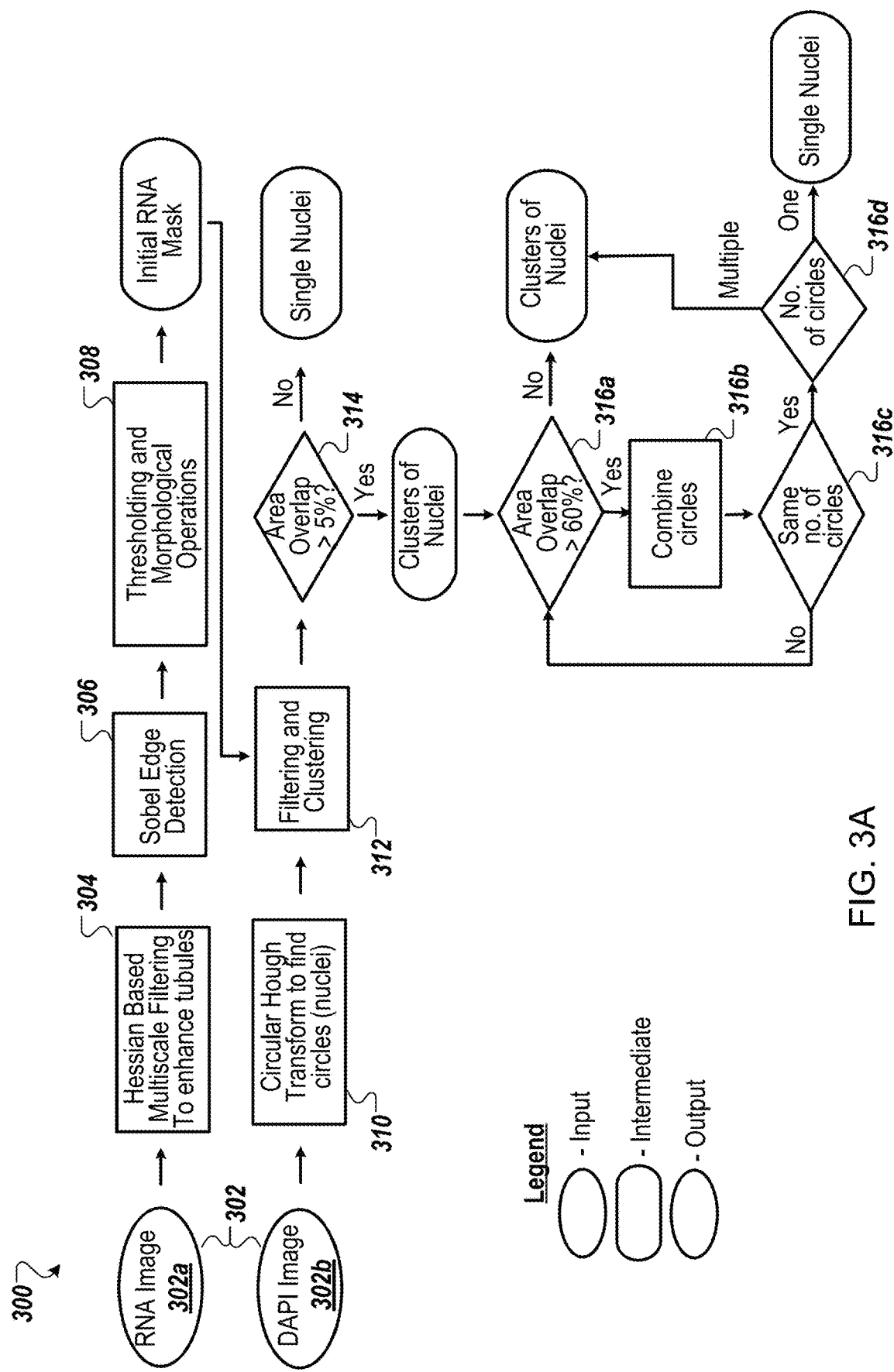
FIGS. 3A-3H depict a flow diagram of, and example images for, a process for generating cell feature data for nuclei in a tissue.
Figure 3B:
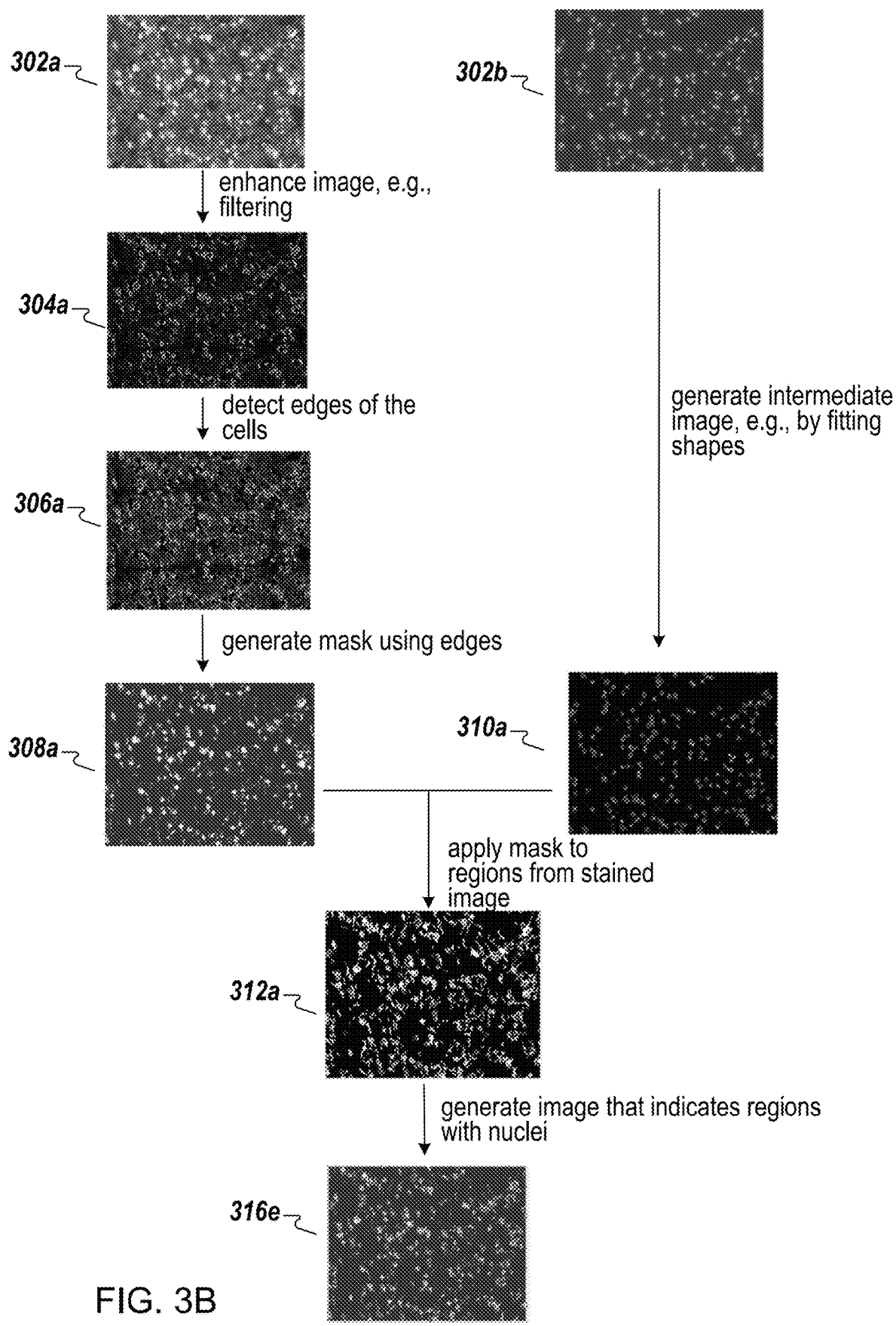

The cell detection system determines positions for a first plurality of regions that fit potential nuclei depicted in the nuclear stained image (212). For instance, the cell detection system uses an appropriate image analysis process to detect the potential nuclei depicted in the nuclear stained image. The cell detection system can use one or more steps described below with reference to FIG. 3A to determine the positions for the first plurality of regions, e.g., step 310.

The cell detection system can remove uneven background illumination from the nuclear stained image. The cell detection system can remove the uneven background illumination by perform a morphological top hat filter, e.g., with a large radius disk element, on the nuclear stained image.

The cell detection system can fit regions to the potential nuclei. The regions can be shapes, e.g., circles or ellipses. The cell detection system can use a Circular Hough Transform to fit the regions to the potential nuclei. The cell detection system can fit the regions to the potential nuclei in the image with the uneven background illumination removed.

In some implementations, the cell detection system can fit regions to potential nuclei with a metric, e.g., diameter, that satisfies a threshold value. For instance, the cell detection system can fit regions to potential nuclei with a metric, e.g., in normalized pixel intensity, that is greater than a minimum threshold value, e.g., 0.15. The cell detection system can fit regions to potential nuclei with a metric that is less than a maximum threshold value.

The cell detection system selects a second plurality of regions from the first plurality of regions by determining, using the mask, which regions from the first plurality of regions overlap with the position of an area from the plurality of areas in the mask (214). The overlapping position can be with respect to corresponding positions from the original images of the tissue that depict content for the same part of the tissue.

For example, the cell detection system applies the mask to the nuclear stained image to determine which regions from the first plurality overlap with an area from the plurality of areas. The cell detection system can reject the unselected regions as not satisfying a threshold likelihood of representing a nucleus, i.e., the regions from the first plurality of regions that are not included in the second plurality of regions. The cell detection system can select the regions in the second plurality of regions as satisfying a threshold likelihood of representing a nucleus.

The cell detection system labels the unique nuclei in the tissue using the second plurality of regions that each indicate a potential nuclei in the tissue (216). For instance, the cell detection system generates data for the regions in the second plurality of regions that identifies the regions as a potential nuclei in the tissue. The data can include location data, such as a center of the region, a shape defined by the region, or other appropriate data.

The order of steps in the process 200 described above is illustrative only, and labelling the nuclei in the tissue can be performed in different orders. For example, the cell detection system can receive a nuclear stained image and then receive a fluorescent in-situ hybridization image or receive both images substantially concurrently. In some examples, the cell detection system can determine the positions for the first plurality of regions substantially concurrently with, or before, generating the mask.

In some implementations, the process 200 can include additional steps, fewer steps, or some of the steps can be divided into multiple steps. For example, the cell detection system can perform steps 206 and 212 through 216 without performing the other steps in the process 200, e.g., without performing one or more of steps 202, 208, or 210.

FIGS. 3A-3H depict a flow diagram of, and example images for, a process 300 for generating cell feature data for nuclei in a tissue. For example, the process 300 can be used by the cell detection system 100 described with reference to FIG. 1.

A cell detection system loads a fluorescent in-situ hybridization image 302a and a nuclear stained image 302b (302). For instance, the cell detection system can load an RNA image, a DNA image, or a virus sequence image. The cell detection system can load, as a nuclear stained image, a 4',6-diamidino-2-phenylindole ("DAPI") image. The cell detection system can load the two images sequentially. Both images depict the same region of a tissue, e.g., brain tissue.

The cell detection system enhances structures in the fluorescent in-situ hybridization image (304). The cell detection system can generate data for an enhanced fluorescent in-situ hybridization image 304a, depicted in FIG. 3B. The data can represent features for the image, image data, or both. The cell detection system can apply Hessian-based multi scale filtering to the fluorescent in-situ hybridization image to enhance structures in the image. The cell detection system can enhance the elongated and tubular structures of the cells in the tissue, e.g., brain cells.

The cell detection system detects edges of the cells depicted in the fluorescent in-situ hybridization image (306). The cell detection system can generate data for an edged fluorescent in-situ hybridization image 306a, depicted in FIG. 3B. The cell detection can find the edges of the cells depicted in the enhanced fluorescent in-situ hybridization image. The cell detection system can apply Sobel edge detection to the fluorescent in-situ hybridization image, or the enhanced image, to find the edges of the cells.

The cell detection system creates an initial mask using the fluorescent in-situ hybridization image (308). The cell detection system can generate an initial mask using data for a segmented image 308a, depicted in FIG. 3B. The cell detection system can create the initial mask of the enhanced fluorescent in-situ hybridization image using the detected edges. The cell detection system can perform thresholding operations, morphological operations, or both, to create the initial mask. The initial mask can indicate cellular areas, e.g., that are likely regions in the tissue that include cell nuclei, and other areas that depict extracellular data, e.g., content in the tissue other than cell nuclei.

For instance, the cell detection system can generate, as the mask, a binary image from the enhanced fluorescent in-situ hybridization image. The cell detection system can use a predefined percentage of a global threshold computed using Otsu's method when generating the binary image.

The cell detection system can perform one or more morphological operations on the binary image. For example, after applying intensity thresholding, some fine features in the initial mask can create artifacts because of weaker or discontinuous signal intensity. The artifacts can be holes or isolated pixels. The cell detection system can clean up the mask by filling one or more holes, removing one or more isolated pixels, or both. In some examples, the cell detection system can perform the operations to connect the fine features depicted in the binary image, remove the isolated pixels depicted in the binary image, fill holes depicted in the binary image, or a combination of two or more of these, to create an initial mask, e.g., to segment the brain cells.

The cell detection system determines regions depicted in the nuclear stained image (310). The cell detection system can generate data for an intermediate image 310a, depicted in FIG. 3B, that represents the regions depicted in the nuclear stained image.

The cell detection system can determine the regions by applying morphological top hat filtering to the nuclear stained image to remove uneven background illumination from the nuclear stained image. The cell detection system can use morphological top hat filtering with a large radius disk element.

The cell detection system can fit a shape to predicted nuclei locations. For instance, the cell detection system can analyze the filtered nuclear stained image to determine predicted nuclei locations depicted in the filtered nuclear stained image. The cell detection system can use a Circular Hough Transform to fit shapes, e.g., ellipses or circles, to the nuclei locations.

The cell detection system can fit shapes to predicted nuclei locations that satisfy one or more thresholds. For instance, the cell detection system can determine predicted nuclei locations for nuclei that each have a metric that satisfies a threshold, e.g., is greater than or equal to, or either, the threshold value.

The cell detection system can use data for the shapes as the data for the intermediate image 310a. For instance, the data for the shapes can represent the circles depicted in the intermediate image 310a.

The cell detection system applies the initial mask to the regions depicted in the nuclear stained image (312). The cell detection system can generate data for a filtered image 312a, depicted in FIG. 3B, as part of this step. For example, the cell detection system can compare the locations of the regions with the initial mask. The cell detection system can select, for the filtered image, the regions from the intermediate image 310a that align with the cellular areas in the initial mask, e.g., the segmented image 308a. For example, when the fluorescent in-situ hybridization image depicts RNA features, the cell detection system can select the regions from the intermediate image 310a that align with areas in the initial mask for which there is an RNA signal.

The cell detection system determines whether a region likely represents a single nuclei or a nuclei cluster (312). For example, the cell detection system determines whether any of the determined regions overlap with other determined regions more than a threshold amount. For any region whose overlap with all other regions does not satisfy the threshold overlap amount, the cell detection system labels the region as representing a single nucleus. In some examples, a region does not satisfy the threshold overlap amount when the amount of overlap between that region and all other regions is less than or equal to five percent. The overlap amount can be a percentage or an area, e.g., measured in microns.

The cell detection system can iteratively analyze all of the regions, e.g., all ellipses or circles, and compute the area overlap between that region and each other region. If the overlap amount between two regions satisfies the threshold overlap amount, the cell detection system can group the two regions together, e.g., as a nuclei cluster. The cell detection system can continue the iterative process to account for regions that overlap with more than one other region.

The cell detection system can store any appropriate data to indicate whether a region belongs to a nuclei cluster or is a single nucleus. For instance, the cell detection system can store data for the centers and radii of any regions that represent a single nucleus, and store data that associates the centers and radii of all regions in a nuclei cluster. The cell detection system can determine that each region either is a single nucleus or belongs to a nuclei cluster.

The cell detection system determines regions that have at least a threshold likelihood of representing a single nucleus (316a-d). The cell detection system can generate data that can represent a second intermediate image 316e, depicted in FIG. 3B, and indicates regions with single nuclei, and nuclei clusters. The cell detection system can combine some regions into a single region due to overfitting.

For instance, the cell detection system can determine an area of overlap between each region in a nuclei cluster. The cell detection system can use the previously computed area of overlap, e.g., from step 314.

The cell detection system can determine whether an area of overlap between two regions in a nuclei cluster satisfies a second overlap threshold value (316a). If none of the areas of overlap for the regions in a nuclei cluster satisfies the second overlap threshold, e.g., are less than or equal to the second overlap threshold, the cell detection system can determine to maintain the nuclei cluster without any changes, e.g., to skip combining of any two regions in the nuclei cluster. If the area of overlap for two regions satisfies the second overlap threshold value, e.g., is greater than the second overlap threshold value, the cell detection system can combine the two regions (316b). For example, the cell detection system can combine regions with an area of overlap greater than sixty percent.

The second overlap threshold value can be for both regions or a single region. For instance, the cell detection system can combine two regions when sixty percent of the smaller region overlaps some of the larger region. In some examples, the cell detection system can combine two regions when sixty percent of each of the regions overlaps the other region, e.g., sixty-five percent of the larger region overlaps the smaller region and seventy-eight percent of the smaller region overlaps the larger region.

The cell detection system determines whether it has analyzed all of the regions in a nuclei cluster (316c). For instance, the cell detection system determines whether an index number for a current region being analyzed is the same as the total number of regions in the nuclei cluster. If the current region number is not the same as the total number of regions, the cell detection system continues the iterative process. The cell detection system performs steps 316a-c for each nuclei cluster.

Once the cell detection system has analyzed all regions in a nuclei cluster, e.g., determines that the current region number is the same as the total number of regions, the cell detection system determines whether the total number of regions is greater than one (316d). If the total number of regions in the nuclei cluster is one, the cell detection system determines that the region represents a single nucleus. If the total number of regions in the nuclei cluster is greater than one, the cell detection system determines that the regions represent a nuclei cluster.

For the nuclei clusters, the cell detection system can perform one or more operations to distinguish the nuclei in a cluster from the other nuclei, as described with reference to FIGS. 3C-D.

Figure 3C:
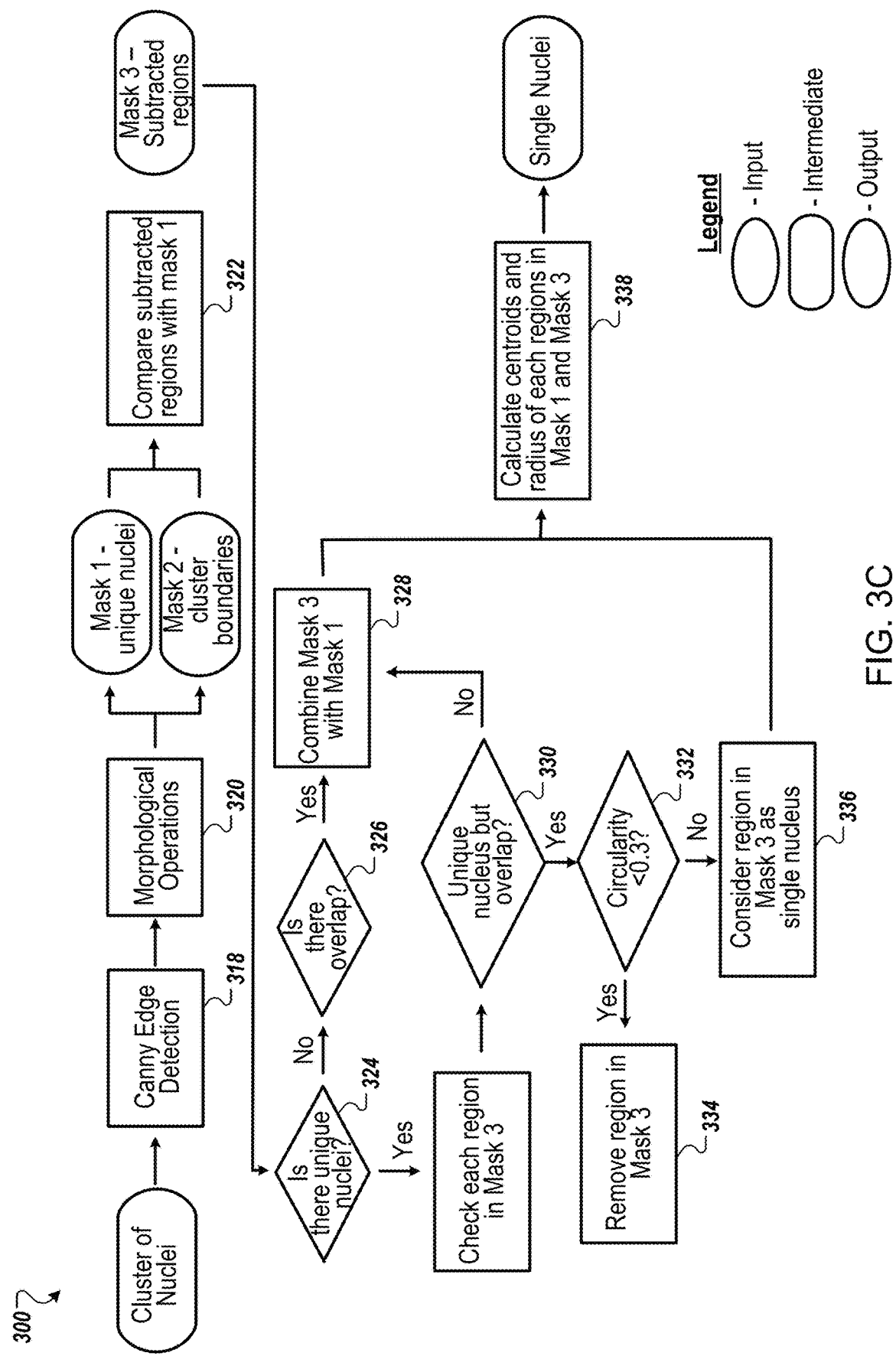
Figure 3D:
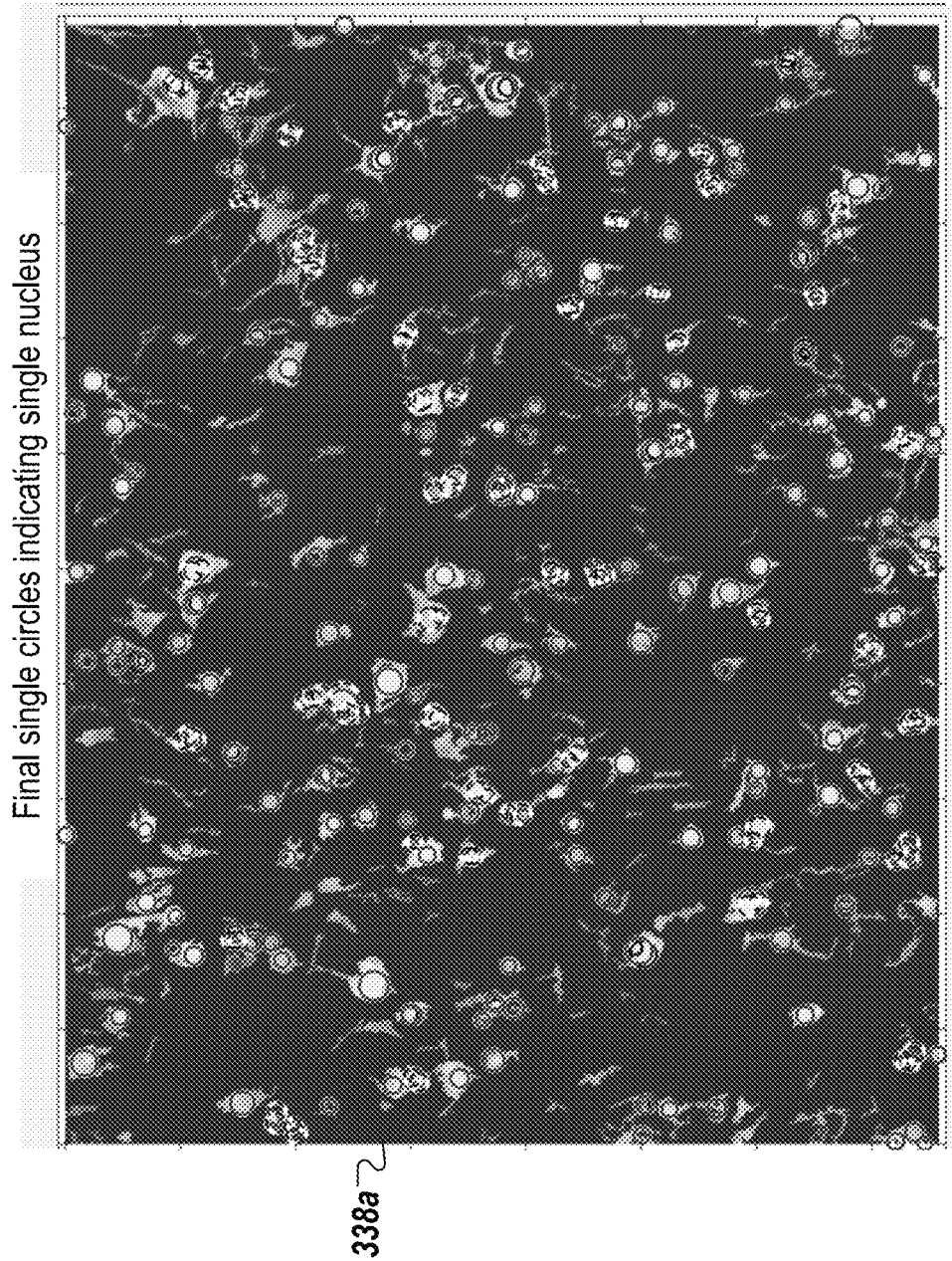

As shown in FIG. 3C, the cell detection system can process each nuclei cluster individually to identify the number of nuclei present. For each nuclei cluster, the cell detection system can create a first mask to section the nuclear stained image signal and a second mask e.g., a circular mask, using detected regions for rejection, as discussed in more detail below.

The cell detection system can apply canny edge detection to the intermediate image to find the edges of the nuclei (318). The intermediate image is the intermediate image 310 generated during step 310.

The cell detection system can perform a first set of morphological operations on the edged image to accentuate the unique, "strong" nuclei in the cluster to generate a unique nuclei mask (320). For example, the cell detection system can perform one or more operations on the edge image similar to the morphological operations described above with reference to step 308.

The cell detection system can label a region as corresponding to a unique, "strong" nucleus when the circularity of the region satisfies a threshold value. For instance, the cell detection system can label the region as corresponding to a unique, strong nucleus when the circularity, e.g., roundness, of the regions is greater than 0.8. The cell detection system can use regions for unique, strong nuclei to extract weaker nuclei, as described in more detail below.

For example, the cell detection system can keep, for the unique nuclei mask, the regions that have an overlap area that satisfies a third overlap threshold value. The third threshold overlap value can be forty percent. In some examples, the cell detection system can remove from the unique nuclei mask the regions whose area of overlap does not satisfy the third overlap threshold value, e.g., when the unique nuclei mask initially has data for regions that both satisfy and do not satisfy the third overlap threshold value.

The cell detection system can perform a second set of morphological operations on the edged image to extract the boundaries of the cluster of nuclei and to generate a cluster boundary mask (320). The cell detection system can keep, for the cluster boundary mask, the regions that have an overlap area that satisfies a fourth overlap threshold value. The cell detection system can remove, from the cluster boundary mask, those regions whose area of overlap does not satisfy the fourth overlap threshold value, e.g., when the cluster boundary mask initially includes those regions. The fourth overlap threshold value can be forty percent. The cell detection system can keep those regions that have an overlap area that is less than forty percent, e.g., that satisfies the fourth overlap threshold value.

In some implementations, the cell detection system can keep, for the cluster boundary mask, the regions whose circularity satisfies a circularity threshold. For instance, the cell detection system can keep the regions whose circularity is above 0.3. The cell detection system can reject, for the cluster boundary mask, the regions whose circularity does not satisfy the circularity threshold.

In some implementations, the cell detection system can keep, for the cluster boundary mask, regions whose area satisfies a threshold area. The cell detection system can reject the regions whose area does not satisfy the threshold area. The threshold area can be 500 pixels. In some examples, the cell detection system can receive data that indicates user input that specifies the threshold area.

The cell detection system subtracts one mask from the other to obtain a subtracted mask (322). For instance, the cell detection system can subtract data for the unique nuclei mask from data for the cluster boundary mask (cluster boundary mask—unique nuclei mask) to obtain subtracted regions in the cluster of nuclei which do not represent unique, strong nuclei. The cell detection system can use data for the subtracted regions as the subtracted mask.

The cell detection system analyzes the subtracted mask to determine whether there are unique nuclei represented by the subtracted mask (324). For instance, the cell detection system can compare each subtracted region in the subtracted mask with the cluster boundary mask. The cell detection system can determine whether a subtracted region from the subtracted mask includes a unique nucleus using a circularity of the subtracted region. For instance, when the circularity of the subtracted region satisfies a threshold value, the cell detection system can determine that the subtracted region includes a unique nucleus. When the circularity of the subtracted region does not satisfy the threshold value, the cell detection system can determine that the subtracted region does not include a unique nucleus. With a threshold value of 0.3, the cell detection system can determine that a subtracted region has a unique nucleus when the circularity of the subtracted region is greater than 0.3. Using the same threshold value, the cell detection system can determine that a subtracted region does not have a unique nucleus when the circularity of the subtracted region is less than or equal to 0.3.

In some implementations, the cell detection system can determine whether the subtracted mask contains a unique, strong nucleus. If the subtracted mask does not include a unique, strong nucleus, the cell detection system can determine that the subtracted mask does not include any unique nuclei. If the subtracted mask includes at least one unique, strong nucleus, the cell detection system can analyze each subtracted region in the subtracted mask to determine whether the subtracted region includes a unique nucleus.

When the cell detection system determines that a subtracted region from the subtracted mask does not include a unique nucleus but there is overlap between the region in the subtracted mask and the cluster boundary mask (326), the cell detection system can add the subtracted region to the unique nuclei mask (328).

When the cell detection system determines that a subtracted region from the subtracted mask includes a unique nucleus, the cell detection system determines whether the subtracted region overlaps with other regions in the subtracted mask (330). If the subtracted region does not overlap with other regions in the subtracted mask, the cell detection system can add the subtracted region to the unique nuclei mask (328).

If the subtracted region overlaps with other regions in the subtracted mask, the cell detection system can determine the circularity of the region. The cell detection system can determine whether the circularity of the region satisfies a threshold circularity (332). The threshold circularity can be 0.3. When the circularity of the subtracted region satisfies the threshold circularity, e.g., is less than 0.3, the cell detection system can remove the region from the subtracted mask (334). When the circularity of the subtracted region does not satisfy the threshold circularity, the cell detection system can label the subtracted region as a single nucleus.

The cell detection system can calculate the centroids, radii, or both for the regions in the unique nuclei mask, the subtracted mask, or both (338). For instance, the cell detection system can calculate the centroids and radii for the regions in both masks. The cell detection system can label each of the regions in the unique nuclei mask and the subtracted mask as single nuclei. The cell detection system can generate data that represents an individual nuclei image 338a, depicted in FIG. 3D.

Figure 3E:
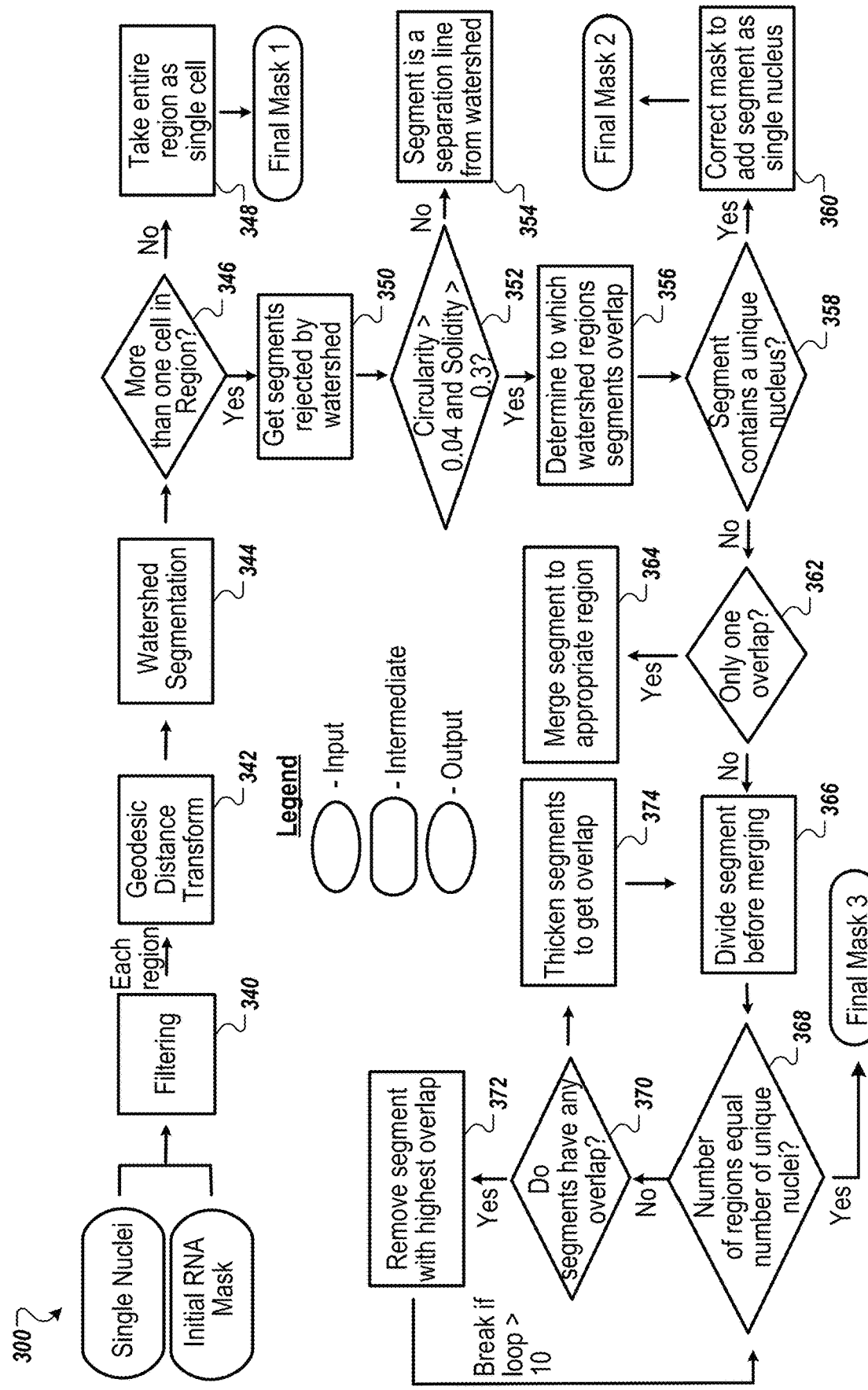

The cell detection system can use data for the locations of the single nuclei to segment the initial mask, e.g., the mask created in step 308, into single nuclei, as described with reference to FIGS. 3E-G.

Figure 3F:
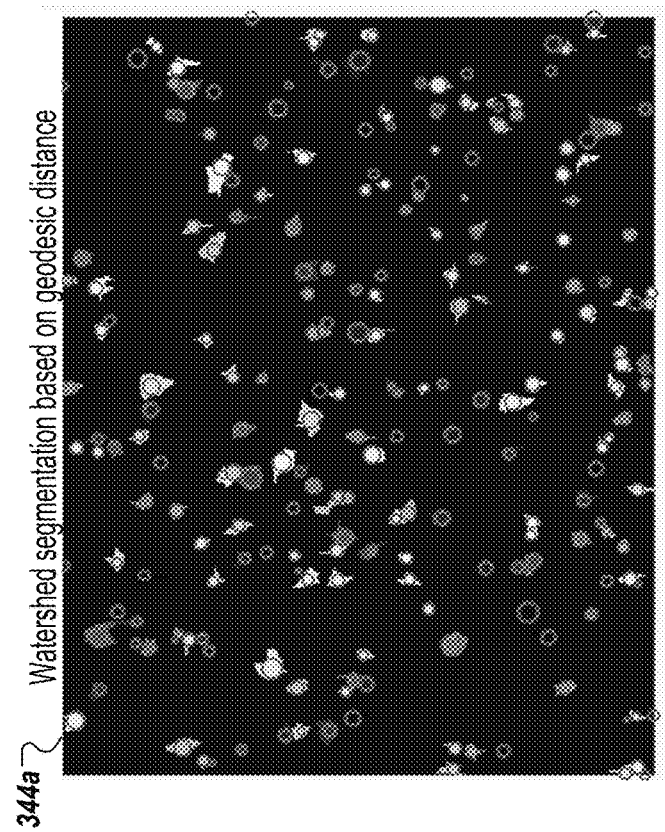
Figure 3F:
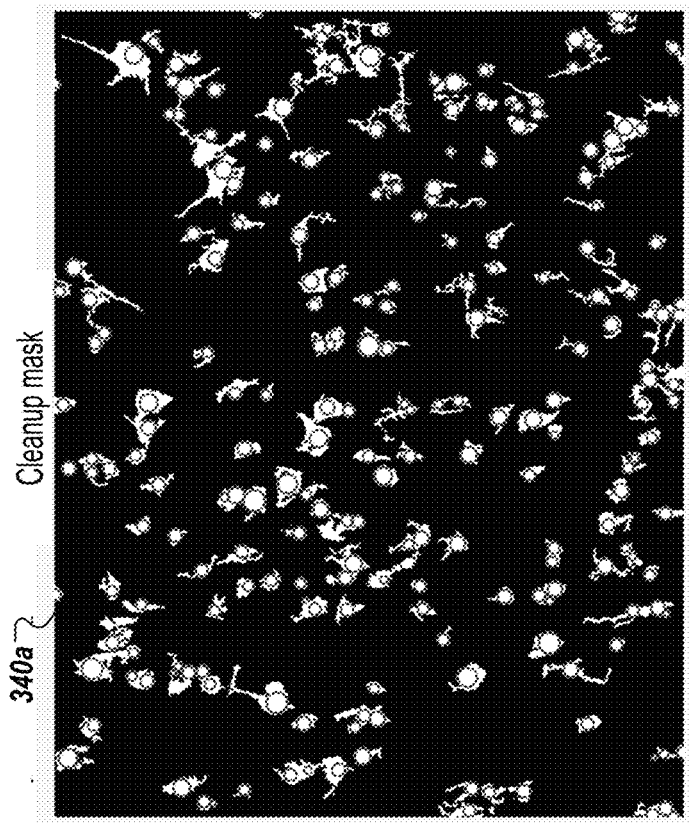
Figure 3G:
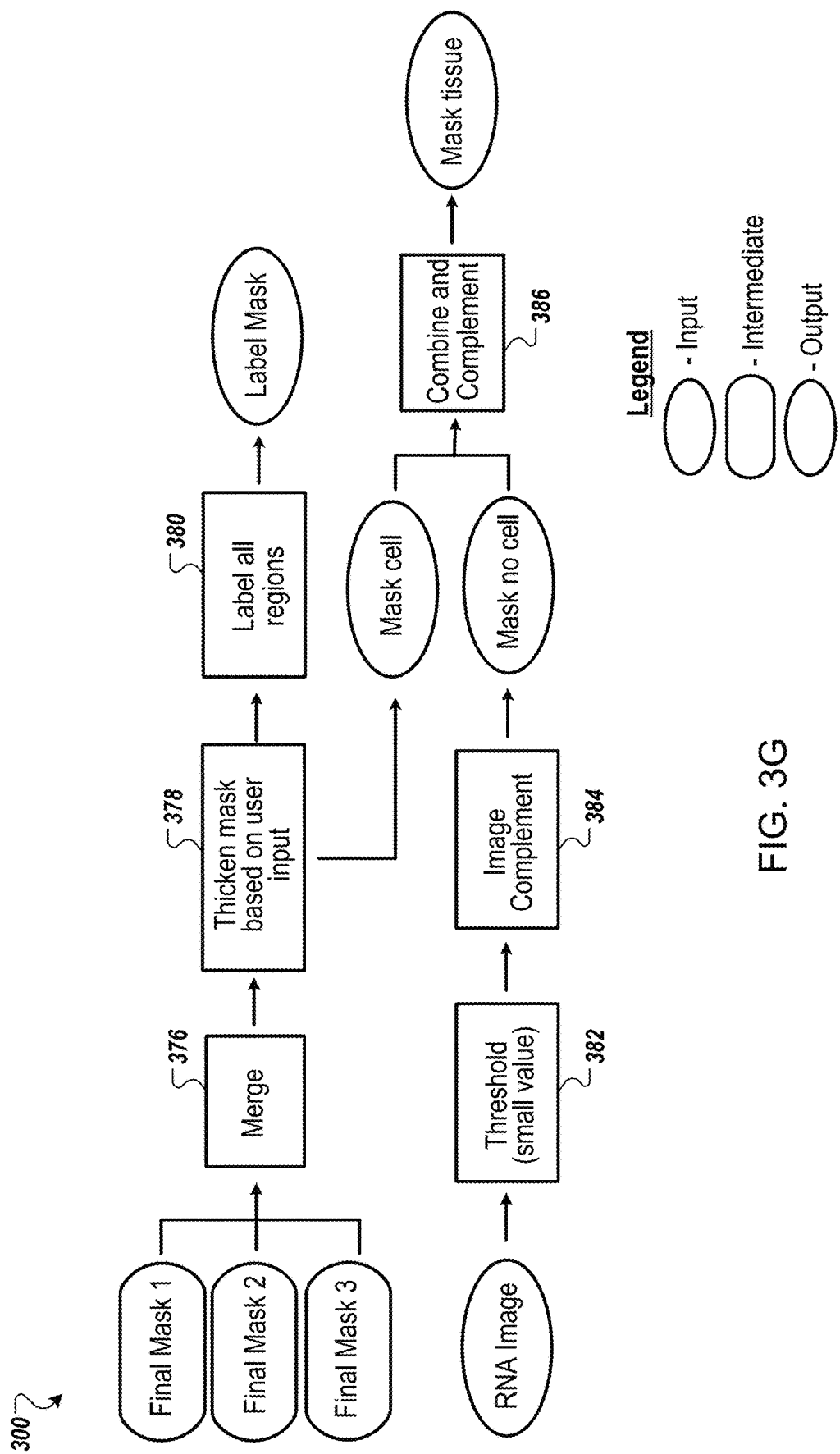

The cell detection system can combine tuples in the initial mask that satisfy a threshold value (340) to create a cleanup mask 340a, depicted in FIG. 3F. For example, the cell detection system can apply a morphological closing operation the initial mask to connect the nearby tubules. The cell detection system can remove, e.g., reject, unconnected regions in the initial mask using the locations of the single nuclei, e.g., from the unique nuclei mask and the subtracted mask.

The cell detection system can process each region in the initial mask to individually segment the regions into single nuclei regions. For instance, the cell detection system can compute a Geodesic Distance Transform (342). The cell detection system can use the centers of the single nuclei in the region as seed points to the transform. The cell detection system can compute a quasi-Euclidean Geodesic Distance Transform. The cell detection system can use the transform to generate data for a third intermediate image.

The cell detection system can apply watershed segmentation on the third intermediate image to segment the region into single nuclei regions (344). For instance, the cell detection system can generate a watershed segmented image 344a, depicted in FIG. 3F, by applying watershed segmentation to an intermediate image generated using the Geodesic Distance Transform.

The cell detection system determines whether there is more than one nucleus in a region (346). Upon determining that there is only a single nucleus in a region, the cell detection system can store data for the entire region, prior to watershed, as the single nuclei (348). The cell detection system can store the data for the entire region in a database, in the unique nuclei mask, or both.

Upon determining that there is a region that includes multiple nuclei, the cell detection system can obtain the segments in the region which were rejected by watershed segmentation (350). For instance, the watershed segmentation can reject the segments with small areas.

The cell detection system can determine whether a region includes multiple nuclei using the unique nuclei mask, described above. The cell detection system can compare the region with the mask to determine a number of cells that overlap between the region and the mask. The cell detection system can then use the number of overlaps as the number of nuclei in that region, e.g., such that a region with multiple nuclei will have multiple overlaps.

The cell detection system can determine whether the rejected segments satisfy one or more thresholds (352). The cell detection system can determine whether the segments have a circularity that satisfies a circularity threshold, e.g., is greater than 0.04. The cell detection system can determine whether the segments have a solidity that satisfies a solidity threshold, e.g., is greater than 0.3.

Upon determining that the rejected segment does not satisfy at least one of the thresholds, the cell detection system can determine that the segment is a separation line (354). The cell detection system can determine to skip further processing for the segment.

Upon determining that the rejected segment satisfies all of the thresholds, the cell detection system can determine to which watershed regions the segment overlaps (356). The cell detection system can determine whether the segment contains a unique nucleus (358). If the segment contains a unique nucleus, the cell detection system can correct a corresponding region to incorporate the segment as a single cell region (360). The cell detection system can update data for the region in the cluster boundary mask to incorporate the segment as a single cell region.

If the segment does not contain a unique nucleus, the cell detection system determines whether the segment overlaps only one watershed region (362). If the segment only overlaps one watershed region, the cell detection system merges the segment to the appropriate watershed region (364).

When the cell detection system determines that the segment overlaps with multiple watershed regions, the cell detection system divides the segment into parts (366). The cell detection system can divide the segment into parts using the segments centroid and endpoints to create lines for separation. The cell detection system merges the parts into corresponding watershed regions (366).

For instance, the cell detection system can, for each segment, find the centroid position of the segment and obtain the endpoints from a skeleton of the segment. From the multiple endpoints for the segment, the cell detection system can determine a number of endpoints that are closest to the centroid of the segment. The cell detection system can use, as the number of endpoints, the number of regions that border the segment. For instance, if the segment is connected to two regions, the cell detection system can find the two closest endpoints; if segment is connected to three regions, the cell detection system can find the three closes endpoints; and so on.

The cell detection system can create a mask of lines of separation starting from the centroid to each of the endpoints. For example, when a segment is connected to two regions, the cell detection system can create two lines, and when a segment is connected to three regions, the cell detection system can create three lines for three, etc.

The cell detection system can divide a segment into two or more parts using a number of watershed regions that connect to the segment. The cell detection system can divide the segment such that there is one part for each region. If the segment connects to two watershed regions, the cell detection system divides the segment into two parts; if the segment connects to three watershed region, the cell detection system divides the segment into three parts; etc. To create the parts, the cell detection system can apply the mask of the lines of separation to the segment to split the segment into the required number of parts.

The cell detection system can then merge the parts created from the segment with the watershed regions. In some examples, the cell detection system can merge the parts into the watershed regions by combining both masks, e.g., the mask of lines of separation and a mask for the watershed regions, using a logical operation.

The cell detection system determines whether the number of regions equals the number of unique nuclei (368). When the number of regions equals the number of unique nuclei, the cell detection system uses the segments to update the rejection mask.

For instance, after applying watershed segmentation, the cell detection system may lose the tubules and protrusions detected in the segmented image 308a. The tubules, protrusions, or both, might appear in the data as segments. Since each watershed region corresponds to a single nucleus, e.g., cell, the cell detection system should keep the number of watershed regions the same while recovering at least some, e.g., all, of the lost tubules and protrusions (which are now the segments) to the corresponding watershed regions.

In some implementations, when the cell detection system merges parts of segments with watershed regions, e.g., in step 366, multiple watershed regions might get merged together. For instance, the cell detection system might accidentally merge two watershed regions together. In this instance, the number of watershed regions would be less than the number of unique nuclei. For example, for two particular adjacent watershed regions that each border a segment, the cell detection system might split the segment into two parts, and merge one of the parts with each of the two particular adjacent watershed regions. If, during the process of merging the parts with the watershed regions, the two watershed regions became one, e.g., got connected to each other, the cell detection system can perform one or more additional operations to correct the merged watershed regions.

When the number of regions does not equal the number of unique nuclei. e.g., and is less than the number of unique nuclei, the cell detection system determines, for each of the segments, a number of times the segment overlaps with a watershed region (370). The cell detection system can remove the segment with the greatest number of overlaps with watershed regions (372). The cell detection system can repeat step 372 until a number of regions matches the number of unique nuclei. In some examples, the cell detection system can repeat step 372 until a threshold number of iterations is satisfied, e.g., for ten iterations.

Upon determining that none of the segments have any overlap with a watershed region, the cell detection system thickens the segments to create overlap between the segments and the regions (374). The cell detection system can perform an iterative process to thicken the segments, e.g., by thickening the segments a first amount, determining whether there is overlap, and repeating this process until there is overlap. Once at least one of the segments overlaps a watershed region, the cell detection system can remove the segment with the highest number of overlaps. For instance, the cell detection system can merge the parts of the segment with the highest number of overlaps with the watershed regions with which the segment overlaps, e.g., perform step 364 or 366 depending on the number of overlaps.

The cell detection system can repeat one or more of steps 340 through 374, e.g., until the number of single cell regions, e.g., the number of watershed regions, matches the number of unique nuclei, based on step 368. Upon determining that the number of single cell regions matches the number of unique nuclei, the cell detection system can combine all the single cell regions for all the regions in the masks, e.g., the unique nuclei mask, the cluster boundary mask, the rejection mask, the initial mask, or a combination of two or more of these.

Figure 3H:
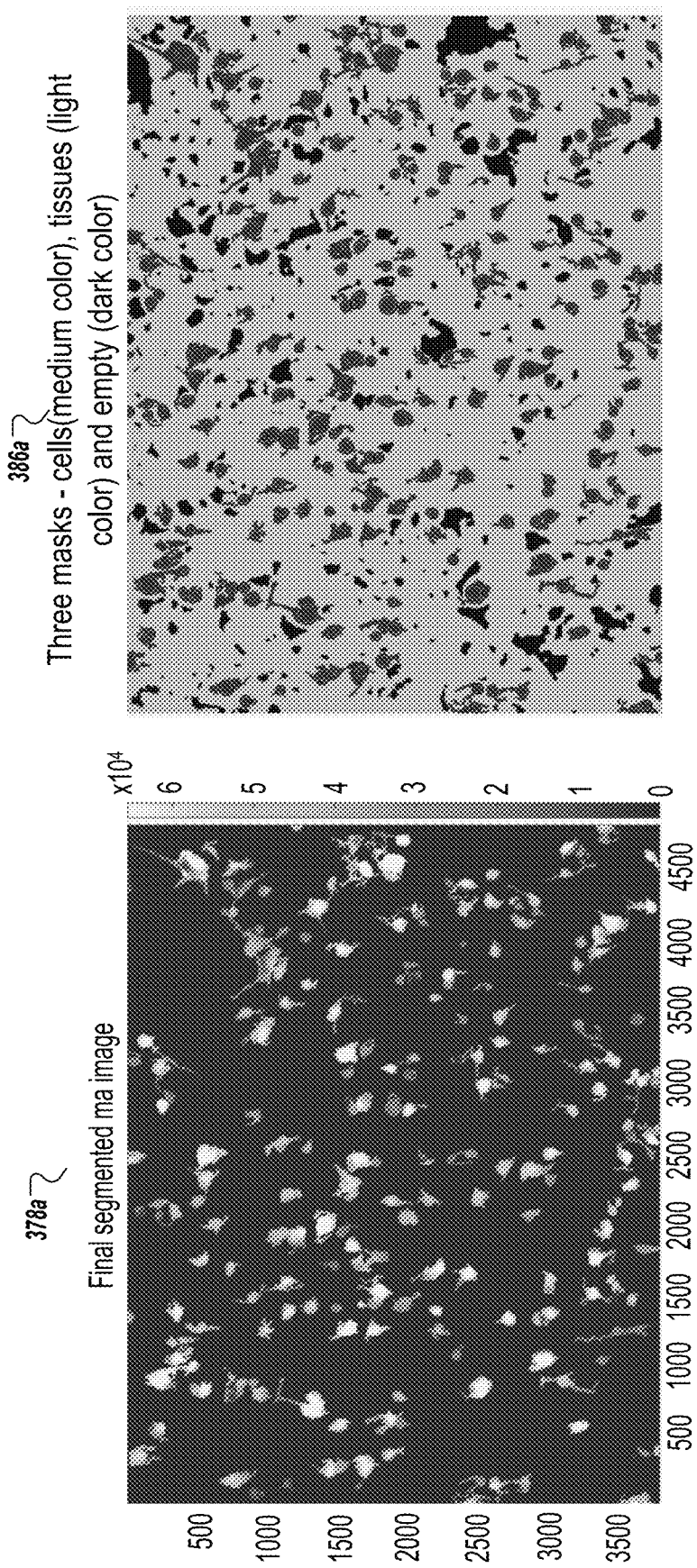

The cell detection system can thicken a mask, label the single cell regions in the mask, or both, as described with reference to FIGS. 3G-H. For instance, the cell detection system can merge the unique nuclei mask, the cluster boundary mask, and the rejection mask to create a final mask (376), e.g., to combine all the single cell regions for all the regions in the masks. The cell detection system can then thicken the final mask, label regions in the final mask, or both.

The cell detection system can thicken the final mask (378). The cell detection system can use a predefined number that indicates a number of pixels. The number of pixels can be a minimum thickness for lines in the mask, a number of pixels to add to each of the lines in the mask, or another appropriate value. The cell detection system can thicken the final mask to generate a clearer signal of the data represented by the mask than a non-thickened mask.

The cell detection system labels the regions in the final mask (380), The cell detection system can label the single cell regions in the final mask. The cell detection system can label the regions in the final mask by creating entries in a database that associate the regions with a label. The regions can be identified by coordinates for the mask. The label can indicate a nucleus classification, gene data, or other appropriate label data for the nucleus that corresponds to the region.

The cell detection system can generate a binary image of the fluorescent in-situ hybridization image (382). In implementations in which the cell detection system previously generated a binary image of the fluorescent in-situ hybridization image, e.g., in step 308, the cell detection system can use the previously generated binary image.

In some examples, the cell detection system can generate a binary image with a 15% global threshold computed using Otsu's method. The cell detection system can generate the complement of the resulting binary image to obtain a no cell mask of the regions with no cells (384).

The cell detection system can generate a combined mask (386). The cell detection system can generate the combined mask from the no cell mask and the thickened final mask, e.g., a cell mask. The cell detection system can generate the combined mask that represents the outside extracellular tissue matrix of tissue.

The cell detection system can store the fluorescent in-situ hybridization image, the nuclear stained image, the centers and radii of the single nuclei, the centers and radii of the final mask, the centers and radii of the combined mask, the centers and radii of the no cell mask, or a combination of two or more of these, in memory. The cell detection system can provide some of the stored data to another system for further processing or use some of the stored data for further processing, e.g., to determine the tissue's spatial organization, connectivity, functional properties, such as an associated gene, or a combination of two or more of these.

The order of steps in the process 300 described above is illustrative only, and generating cell feature data for nuclei in a tissue can be performed in different orders. For example, the cell detection system can perform step 310 before or substantially concurrently with steps 304 through 308. The cell detection system can perform step 382 before or substantially concurrently with any of steps 310 through 380, The cell detection system can perform steps 310 through 338 after or substantially concurrently with steps 340 through 358.

In some implementations, the process 300 can include additional steps, fewer steps, or some of the steps can be divided into multiple steps. For example, the cell detection system can perform steps 304 through 312 without performing any of the other steps in the process 300, The cell detection system can perform steps 304 through 312 with one or more of steps 318 through 336 without performing the other steps in the process 300.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
   obtaining a fluorescent in-situ hybridization image of a tissue that depicts a plurality of cells;
   obtaining a nuclear stained image of the tissue;
   generating a mask that includes a plurality of areas that each have a position with respect to the tissue by:
   enhancing, in the fluorescent in-situ hybridization image, structures depicted in the fluorescent in-situ hybridization image; and
   detecting edges of cells depicted in the enhanced fluorescent in-situ hybridization image to use for the mask;
   determining positions for a first plurality of regions that fit potential nuclei depicted in the nuclear stained image;
   selecting a second plurality of regions from the first plurality of regions by determining, using the mask, which regions from the first plurality of regions overlap with the position of an area from the plurality of areas in the mask; and
   labelling unique nuclei in the tissue using the second plurality of regions that i) each indicate a potential nucleus in the tissue and ii) were selected as the regions from the first plurality of regions that overlap with the position of an area from the plurality of areas in the mask, the labeling comprising:
   associating each region in the second plurality of regions with a nuclei cluster;
   for each of the nuclei clusters:
   determining, for each region associated with the nuclei cluster, an area of overlap between the region and a closest region in the nuclei cluster using the positions of the regions with respect to the tissue; and generating a first mask that represents each region associated with the nuclei cluster whose area of overlap satisfies a threshold overlap and size satisfies a first threshold size using the nuclear stained image;

generating a second mask that represents each region associated with the nuclei cluster whose area of overlap satisfies the threshold overlap and size satisfies a second threshold size smaller than the first threshold size using the nuclear stained image;

generating a third mask using a difference between the first mask and the second mask, the third mask including one or more subtracted regions that represent the difference;

updating the first mask to include the subtracted regions from the third mask that overlap with a region represented by the second mask and do not depict a unique nucleus; and labelling the unique nuclei of the tissue using the first mask, the second mask, and the third mask.

2. The method of claim 1, comprising:
performing edge detection on data for the nuclear stained image of the tissue to generate edge detection data, wherein generating the first mask comprises generating the first mask using the edge detection data.

3. The method of claim 1, comprising labelling, for each subtracted region in a third mask that has a unique nucleus and whose size satisfies the second threshold size, a subtracted region from the third mask as a unique nucleus.

4. The method of claim 1, wherein:
obtaining the fluorescent in-situ hybridization image comprises obtaining the fluorescent in-situ hybridization image of the tissue that has an extracellular matrix; and
obtaining the nuclear stained image of the tissue comprises obtaining the nuclear stained image of the tissue that has an extracellular matrix.

5. The method of claim 1, wherein:
obtaining the fluorescent in-situ hybridization image comprises obtaining the fluorescent in-situ hybridization image of the tissue that depicts the plurality of cells with tubular structures; and
obtaining the nuclear stained image of the tissue comprises obtaining the nuclear stained image of the tissue that depicts the plurality of cells with tubular structures.

6. The method of claim 1, wherein detecting edges depicted in the enhanced fluorescent in-situ hybridization image comprises:
generating a binary image from the enhanced fluorescent in-situ hybridization image;
generating an updated binary image by performing one or more of:
connecting fine features depicted in the binary image;
removing isolated pixels depicted in the binary image; and
filling holes depicted in the binary image; and
detecting edges depicted in the updated binary image.

7. A system comprising one or more computers and one or more storage devices on which are stored instructions that are operable, when executed by the one or more computers, to cause the one or more computers to perform operations comprising:
obtaining a fluorescent in-situ hybridization image of a tissue that depicts a plurality of cells;
obtaining a nuclear stained image of the tissue;
generating a mask that includes a plurality of areas that each have a position with respect to the tissue by:
enhancing, in the fluorescent in-situ hybridization image, structures depicted in the fluorescent in-situ hybridization image; and
detecting edges of cells depicted in the enhanced fluorescent in-situ hybridization image to use for the mask;

determining positions for a first plurality of regions that fit potential nuclei depicted in the nuclear stained image;

selecting a second plurality of regions from the first plurality of regions by determining, using the mask, which regions from the first plurality of regions overlap with the position of an area from the plurality of areas in the mask; and labelling unique nuclei in the tissue using the second plurality of regions that i) each indicate a potential nucleus in the tissue and ii) were selected as the regions from the first plurality of regions that overlap with the position of an area from the plurality of areas in the mask, the labeling comprising:
associating each region in the second plurality of regions with a nuclei cluster;
for each of the nuclei clusters:
determining, for each region associated with the nuclei cluster, an area of overlap between the region and a closest region in the nuclei cluster using the positions of the regions with respect to the tissue; and generating a first mask that represents each region associated with the nuclei cluster whose area of overlap satisfies a threshold overlap and size satisfies a first threshold size using the nuclear stained image;

generating a second mask that represents each region associated with the nuclei cluster whose area of overlap satisfies the threshold overlap and size satisfies a second threshold size smaller than the first threshold size using the nuclear stained image;

generating a third mask using a difference between the first mask and the second mask, the third mask including one or more subtracted regions that represent the difference;

updating the first mask to include the subtracted regions from the third mask that overlap with a region represented by the second mask and do not depict a unique nucleus; and labelling the unique nuclei of the tissue using the first mask, the second mask, and the third mask.

8. The system of claim 7, the operations comprising:
performing edge detection on data for the nuclear stained image of the tissue to generate edge detection data, wherein generating the first mask comprises generating the first mask using the edge detection data.

9. The system of claim 7, wherein:
obtaining the fluorescent in-situ hybridization image comprises obtaining the fluorescent in-situ hybridization image of the tissue that has an extracellular matrix; and
obtaining the nuclear stained image of the tissue comprises obtaining the nuclear stained image of the tissue that has an extracellular matrix.

10. The system of claim 7, wherein:
obtaining the fluorescent in-situ hybridization image comprises obtaining the fluorescent in-situ hybridization image of the tissue that depicts the plurality of cells with tubular structures; and obtaining the nuclear stained image of the tissue comprises obtaining the nuclear stained image of the tissue that depicts the plurality of cells with tubular structures.

11. The system of claim 7, wherein detecting edges depicted in the enhanced fluorescent in-situ hybridization image comprises:
  generating a binary image from the enhanced fluorescent in-situ hybridization image;
  generating an updated binary image by performing one or more of:
    connecting fine features depicted in the binary image;
    removing isolated pixels depicted in the binary image; and
    filling holes depicted in the binary image; and
  detecting edges depicted in the updated binary image.

12. The system of claim 7, wherein detecting edges depicted in the enhanced fluorescent in-situ hybridization image comprises:
  generating a binary image from the enhanced fluorescent in-situ hybridization image;
  generating an updated binary image by performing:
    connecting fine features depicted in the binary image;
    removing isolated pixels depicted in the binary image; and
    filling holes depicted in the binary image; and
  detecting edges depicted in the updated binary image.

13. One or more non-transitory computer storage media encoded with instructions that, when executed by one or more computers, cause the one or more computers to perform operations comprising:
  obtaining a fluorescent in-situ hybridization image of a tissue that depicts a plurality of cells;
  obtaining a nuclear stained image of the tissue;
  generating a mask that includes a plurality of areas that each have a position with respect to the tissue by:
    enhancing, in the fluorescent in-situ hybridization image, structures depicted in the fluorescent in-situ hybridization image; and
    detecting edges of cells depicted in the enhanced fluorescent in-situ hybridization image to use for the mask;
  determining positions for a first plurality of regions that fit potential nuclei depicted in the nuclear stained image;
  selecting a second plurality of regions from the first plurality of regions by determining, using the mask, which regions from the first plurality of regions overlap with the position of an area from the plurality of areas in the mask; and
  labelling unique nuclei in the tissue using the second plurality of regions that i) each indicate a potential nucleus in the tissue and ii) were selected as the regions from the first plurality of regions that overlap with the position of an area from the plurality of areas in the mask, the labeling comprising:
    associating each region in the second plurality of regions with a nuclei cluster;
    for each of the nuclei clusters:
      determining, for each region associated with the nuclei cluster, an area of overlap between the region and a closest region in the nuclei cluster using the positions of the regions with respect to the tissue; and
      generating a first mask that represents each region associated with the nuclei cluster whose area of overlap satisfies a threshold overlap and size satisfies a first threshold size using the nuclear stained image;
      generating a second mask that represents each region associated with the nuclei cluster whose area of overlap satisfies the threshold overlap and size satisfies a second threshold size smaller than the first threshold size using the nuclear stained image;
      generating a third mask using a difference between the first mask and the second mask, the third mask including one or more subtracted regions that represent the difference;
      updating the first mask to include the subtracted regions from the third mask that overlap with a region represented by the second mask and do not depict a unique nucleus; and
      labelling the unique nuclei of the tissue using the first mask, the second mask and the third mask.

14. The one or more non-transitory computer storage media of claim 13, the operations comprising:
  performing edge detection on data for the nuclear stained image of the tissue to generate edge detection data, wherein generating the first mask comprises generating the first mask using the edge detection data.

15. The one or more non-transitory computer storage media of claim 13, wherein:
  obtaining the fluorescent in-situ hybridization image comprises obtaining the fluorescent in-situ hybridization image of the tissue that has an extracellular matrix; and
  obtaining the nuclear stained image of the tissue comprises obtaining the nuclear stained image of the tissue that has an extracellular matrix.

16. The one or more non-transitory computer storage media of claim 13, wherein:
  obtaining the fluorescent in-situ hybridization image comprises obtaining the fluorescent in-situ hybridization image of the tissue that depicts the plurality of cells with tubular structures; and
  obtaining the nuclear stained image of the tissue comprises obtaining the nuclear stained image of the tissue that depicts the plurality of cells with tubular structures.

17. The one or more non-transitory computer storage media of claim 13, wherein detecting edges depicted in the enhanced fluorescent in-situ hybridization image comprises:
  generating a binary image from the enhanced fluorescent in-situ hybridization image;
  generating an updated binary image by performing one or more of:
    connecting fine features depicted in the binary image;
    removing isolated pixels depicted in the binary image; and
    filling holes depicted in the binary image; and
  detecting edges depicted in the updated binary image.

18. The one or more non-transitory computer storage media of claim 13, wherein detecting edges depicted in the enhanced fluorescent in-situ hybridization image comprises:
  generating a binary image from the enhanced fluorescent in-situ hybridization image;
  generating an updated binary image by performing:
    connecting fine features depicted in the binary image;
    removing isolated pixels depicted in the binary image; and
    filling holes depicted in the binary image; and
  detecting edges depicted in the updated binary image.

* * * * *